Patented Mar. 9, 1943

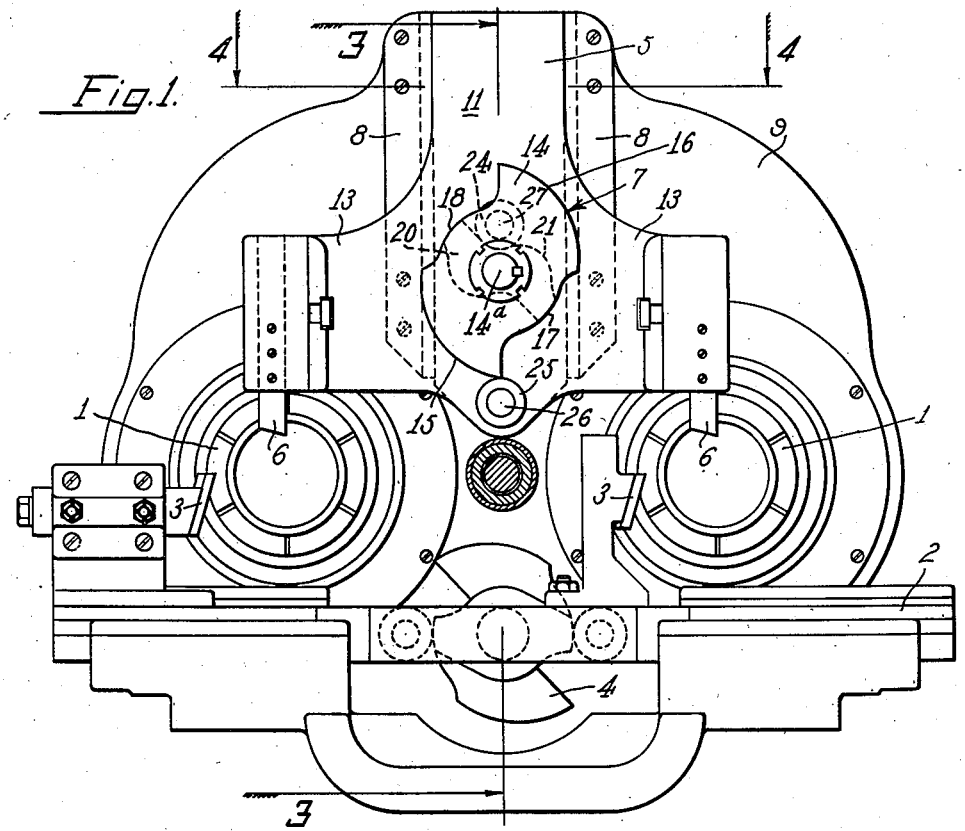
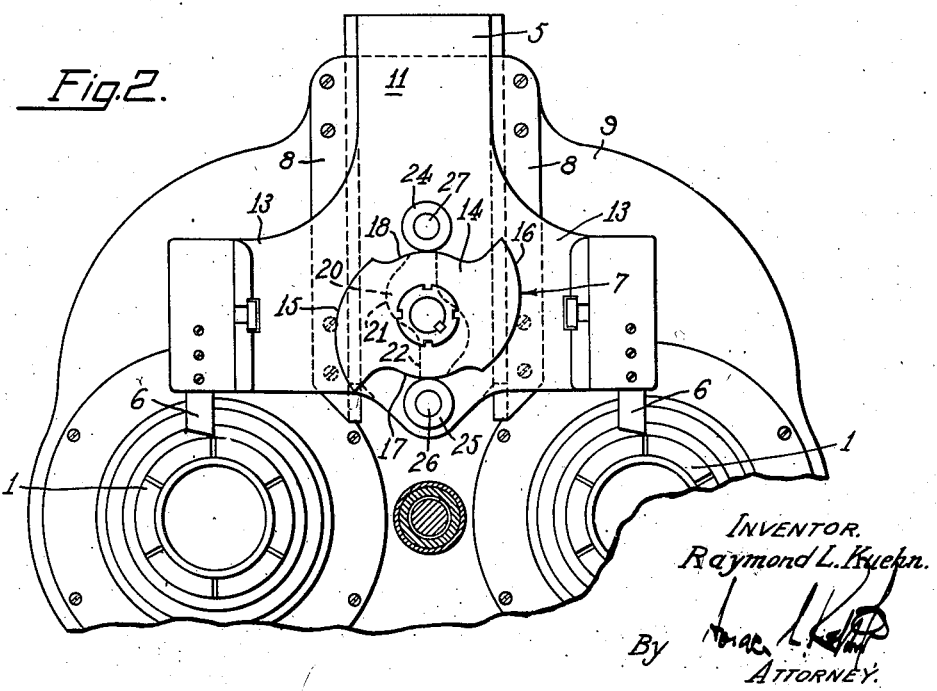

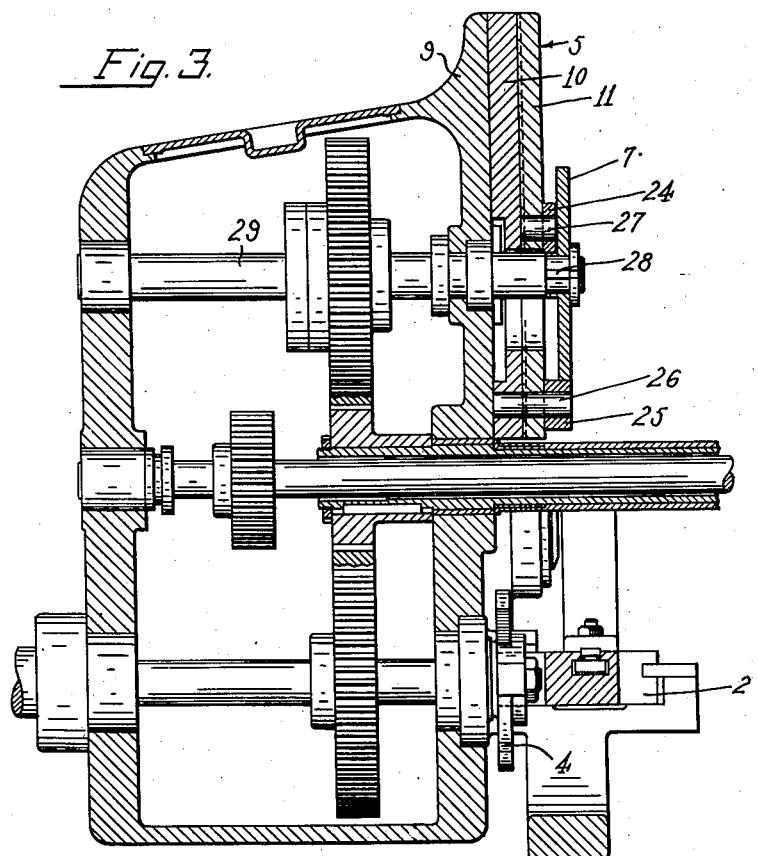

2,313,558

UNITED STATES PATENT OFFICE 2,313,558

MACHINE TOOL

Raymond L. Kuehn, Hartford, Conn., assignor to The Billings & Spencer Company, a corporation of Connecticut Application July 14, 1941, Serial No. 402,305

11 Claims. (Cl. 164—34)

My invention relates to machine tools.

It has among its objects to provide an improved cut off mechanism for such a tool and, more particularly, an improved vertical cut off mechanism of the type described and claimed in the Elmer E. Kelley application Serial No. 348,415, filed July 30, 1940. Further objects of my invention are to provide an improved cut off mechanism of this type including an improved single slide mechanism and having operating cam mechanism therefor disposed in a new location relative to said slide and the tools carried thereon, and also to provide such improved cam mechanism whereby the structure is made entirely positive and free from backlash in operation. Still other objects are to produce such an improved structure whereby it is made possible materially to reduce the number of parts required while reducing the expense and wear and insuring satisfactory operation of the cut off mechanism in properly timed relation to the other mechanisms. These and other objects and advantages of my improvements will, however, hereinafter more fully appear.

In the accompanying drawings, I have shown for purposes of illustration one embodiment which my invention may assume in practice.

In these drawings:

Figure 1 is an end elevation of the headstock of a two-at-a-time machine equipped with my improvements;

Fig. 2 is a similar view showing the cut off mechanism in another position, some parts being omitted to facilitate illustration;

Fig. 3 is a vertical section on line 3—3 of Figure 1;

Fig. 4 is a horizontal section on line 4—4 of Figure 1, and

Fig. 5 is an enlarged detail of the opposite side of the operating cam from that shown in Figures 1 and 2.

In this illustrative construction, I have shown my improvements as applied to a standard type of two-at-a-time machine of the type described and claimed in the Elmer E. Kelley, Patent No. 2,255,170, patented September 9, 1941, and including, among other usual mechanisms, parallel work rotating spindles 1, and transverse tool slide mechanism 2 carrying forming tools 3 and operated by a cam 4; my improvements herein comprising improved cut off mechanism including an improved single slide 5 carrying laterally spaced cut off tools 6 operating upon the work in both spindles 1 and operated by improved cam mechanism 7, all as hereinafter more fully described.

Referring more particularly to the slide 5, it will be noted that, as shown in Figure 4, the same is movable vertically above and between the spindles 1 in suitable guides 8 provided on the machine frame 9. This slide herein includes two parts, one a part 10 movable in the guides 8, and the other a part 11 suitably attached thereto, as by screws 12, and disposed in front of the guides. Further, it will be observed that this outer portion 11 has oppositely directed lateral extensions 13 at its lower end. Herein, these portions 13 extend laterally over the axes of the work at points in front of the spindles and have the cut off tools 6 suitably fixed to and vertically adjustable in their extremities. Thus, it will be apparent that when the slide 5 is moved vertically downward after the completion of the forming operation performed by the tools 3, the cut off tools 6 thereon will act to cut off the work gripped in the rotating spindles 1 in the desired manner.

The cam mechanism 7 which effects the vertical reciprocation of the slide 5, is also of an improved construction. As shown, it includes an improved double lobe cam member 14 having like oppositely disposed arcuate camming lobes 15 and 16 disposed in the same plane. These lobes 15 and 16 herein have elongated working faces as compared with the corresponding lobes of the transverse slide operating cam of the above Kelley application, the same herein each enclosing an angle of 90°, while continuing to have one end of the same nearer than the other to the axis 14a of the member 14. Herein, moreover, improved dwell portions 17 and 18 are provided connecting opposite ends of the lobes 15 and 16. As shown, each of these portions 17 and 18 includes an elongated raised arcuate center portion struck about the axis 14a of the cam 14 and symmetrical on opposite sides of its center and leading on one end to the adjacent low portion of one of the cam lobes 15, 16 and at the other end to the adjacent high portion of the other of the cam lobes 15, 16. Further, it will be observed that the cam member 14 is provided in rear of the lobe portions 15, 16 with a cooperating cam portion 20 which is disposed relatively transversely of the cam member 14 between the raised portions 17, 18 thereof and in planes parallel to the plane of the lobes 15, 16. As shown, the opposite halves of this portion 20 are identical and each of the same is provided with a convex portion 21 and an opposite inclined portion 22. Herein also, the convex portion of each half merges into the inclined portion of the other half and the extremity of each of the oppositely disposed halves thus provided terminates in the raised portions 17, 18 and extends a substantial distance on one side and a slight distance on the opposite side of an imaginary center line extending through the axis 14a, and bisecting the portions 17, 18. Further, it will be observed that cooperating cam rollers 24 and 25 are provided on the slide 5 in the longitudinal center line of the latter which are respectively adapted to engage the cam portions 20 and 14, the roller 25 being carried on the front end of an elongated bottom pin 26 extending through both members 10 and 11 of the slide 5, and the roller 24 being carried on a short pin 27 extending through the front member 11.

Thus, in the operation of the cut off mechanism, with the two cam portions 14 and 20 integrally united or, as preferably, formed in a single member and suitably fixed, as at 28, to a drive shaft 29, it will be apparent that with the shaft 29 rotated in the usual manner in timed relation to the transverse tool slide 2, the slide 5 carrying the cut off tools 6 will be fed downward slowly by this improved cam mechanism to effect cutting off of the work after the same has been formed by the forming tools on the slide 2. Further, it will be noted that the entire slide 5 is moved positively downward and that upon the completion of the cutting off operation, the slide is then positively moved upward quickly, both without having any backlash between the rollers 24, 25 and their respective cam surfaces; the roller 24 always being in contact with the cam 20 and the roller 25 always being in contact with the cam 14 as shown, for example, in Figures 1 and 2.

As a result of my improved construction, it is made possible to eliminate the separate vertical slides for each cut off tool heretofore necessary, while also eliminating either a cooperating transverse cam slide or other additional separate mechanism for operating such separate vertical slides and while continuing to obtain the desired reverse operations at different speeds of the cut off tools for each revolution of the operating shaft 29. Further, as compared with the prior double lobed cam construction heretofore used on the transverse tool slide, it is also made possible, through the improved construction of the cam mechanism 7, to eliminate the backlash previously present in such a double lobed cam construction. At the same time, the structure is materially simplified and cheapened, while the necessary wearing surfaces are materially reduced in number and any wear is confined to the surfaces of the cam portions 14 and 20 and their cooperating rollers 24 and 25 which are well adapted to withstand long wear in service. These and other advantages of my improvements will, however, be apparent to those skilled in the art. It will also be evident that as regards various features of my improved combination of single slide, operating cam means therefor, and tools carried by the slide, my invention is not limited to the particular cam structure illustrated, and may be used in connection with various forms of cam means.

While I have herein specifically described one embodiment which my invention may assume in practice, it will be understood that this form has been shown for purposes of illustration, and that the invention may be modified and embodied in other forms without departing from its spirit or the scope of the appended claims.

What I claim as new and desire to secure by Letters Patent is:

1. In a machine tool, a tool carrying slide, followers thereon longitudinally spaced adjacent one end of said slide, operating means for said slide comprising cams rotatable about a common axis between said followers and each having surfaces engaging a different follower, and tools carried on opposite sides of said end of said slide and on opposite sides of said cams.

2. In a tool slide operating mechanism for machine tools, a tool slide, a plurality of double lobed cams rotatable about a common axis, one of said cams being larger than the other and having oppositely disposed lobes on opposite ends thereof and symmetrical dwell portions connecting said lobes, and the smaller cam being disposed at right angles to the larger cam and having its extremities terminating in opposite dwell portions, and cooperating cam followers carried on said slide adjacent one end thereof and comprising spaced rollers constantly engaging different cams.

3. In a tool slide operating mechanism for machine tools, a tool slide, a plurality of double lobed cams rotatable about a common axis, one of said cams being larger than the other and having convex lobe portions most remote from the axis of the cam at diametrically opposite points, and said smaller cam having concave portions at diametrically opposite points, and cooperating cam followers carried on said slide adjacent one end thereof and comprising spaced rollers constantly engaging said different cams and one received in said concave portions while the other passes off of the remote extremities of the convex portions of the larger cam.

4. In a machine tool, laterally spaced work rotating spindles on parallel axes, a slide movable perpendicularly to said axes and carrying tools operating on work in said spindles, and cam mechanism for reciprocating said slide including followers longitudinally spaced on said slide and rotatable cam means between said followers and cooperating therewith.

5. In a machine tool, laterally spaced work rotating spindles on parallel axes, a slide movable perpendicularly to said axes and carrying tools operating on work in said spindles, and cam mechanism for reciprocating said slide including cam followers longitudinally spaced thereon and rotating cams cooperating with different followers and rotatable about a common axis in a vertical plane between said spindles.

6. In a machine tool, laterally spaced work rotating spindles on parallel axes, a slide movable perpendicularly to said axes and carrying tools operating on work in said spindles, and cam mechanism for reciprocating said slide including cam followers longitudinally spaced thereon and rotating cams cooperating with different followers and comprising a pair of double lobed cams rotatable about a common axis in a plane midway between the axes of said spindles.

7. In a machine tool, laterally spaced work rotating spindles on parallel axes, a slide movable perpendicularly to said axes and carrying cut-off tools operating on work in said spindles, and cam mechanism for reciprocating said slide including followers longitudinally spaced on said slide and rotatable cam means between said followers and cooperating therewith, said spindles being horizontally disposed and said slide vertically reciprocable and said tools comprising cut off tools.

8. In a machine tool, laterally spaced work rotating spindles on parallel axes, a slide movable perpendicularly to said axes and carrying tools operating on work in said spindles, and cam mechanism for reciprocating said slide including cam followers longitudinally spaced thereon and rotating cams cooperating with different followers, said spindles being horizontally disposed and said slide vertically reciprocable and having said followers vertically spaced in the longitudinal center line thereof and said tools comprising cut-off tools.

9. In a machine tool, laterally spaced work rotating spindles on parallel axes, a slide movable perpendicularly to said axes and carrying tools operating on work in said spindles, and cam mechanism for reciprocating said slide including followers longitudinally spaced on said slide and rotatable cam means between said followers, said spindles being horizontally disposed and said slide being vertically reciprocable above the space between said spindles and having lateral extensions on the lower end of said slide on opposite sides of said cam means and overlying the axes of said spindles and also having said tools carried on said extensions.

10. In a machine tool, laterally spaced work rotating spindles on parallel axes, a slide movable perpendicularly to said axes, and cam mechanism for reciprocating said slide including followers longitudinally spaced on the lower end of said slide and rotatable cam means between said followers on the lower end of said slide, said spindles being horizontally disposed and said slide being vertically reciprocable and narrower than and centrally disposed above the space between the axes of said spindles, opposite lateral extensions carried on the lower end of said slide on opposite sides of said cam means and overlying the axis of said spindles, and tools carried by said extensions and operating on work in said spindles.

11. In a machine tool, laterally spaced work rotating spindles on parallel axes, a slide movable perpendicularly to said axes and carrying tools operating on work in said spindles, and cam mechanism for reciprocating said slide including cam followers longitudinally spaced thereon and rotating cams cooperating with different followers, said cams comprising a pair of double lobed cams disposed in different parallel planes and rotatable about a common axis in a plane midway between the axes of said spindles, said spindles being horizontally disposed and said slide being vertically reciprocable and narrower than and centrally disposed above the space between the axes of said spindles and having opposite lateral extensions on the lower end of said slide overlying the axes of said spindles, and said tools comprising cut-off tools carried by said extensions.

RAYMOND L. KUEHN.